US010235004B1

(12) United States Patent
Lynn et al.

(10) Patent No.: US 10,235,004 B1
(45) Date of Patent: Mar. 19, 2019

(54) TOUCH INPUT DETECTOR WITH AN INTEGRATED ANTENNA

(71) Applicant: Sentons Inc., Grand Cayman (KY)

(72) Inventors: Lapoe E. Lynn, Los Altos, CA (US);
Samuel W. Sheng, Saratoga, CA (US);
Shih-Ming Shih, San Jose, CA (US);
Yenyu Hsieh, San Jose, CA (US);
Michael L. Khitrov, Santa Clara, CA (US)

(73) Assignee: Sentons Inc. (KY)

( * ) Notice: Subject to any disclaimer, the term of this patent is extended or adjusted under 35 U.S.C. 154(b) by 331 days.

(21) Appl. No.: 13/681,279

(22) Filed: Nov. 19, 2012

Related U.S. Application Data

(60) Provisional application No. 61/561,656, filed on Nov. 18, 2011.

(51) Int. Cl.
*H04B 5/00* (2006.01)
*H03G 3/32* (2006.01)
*G06F 3/043* (2006.01)
*G06F 3/041* (2006.01)
*G06F 3/0354* (2013.01)
*G06F 3/045* (2006.01)
*G01H 3/06* (2006.01)
(Continued)

(52) U.S. Cl.
CPC .................... *G06F 3/046* (2013.01)

(58) Field of Classification Search
CPC ...... G06F 3/03547; G06F 3/044; G06F 3/038; G06F 3/0412; G06F 3/0436; H01Q 1/243; G09F 3/0414; H04B 5/0031
USPC ............. 315/169.3; 340/5.52, 5.61; 343/702, 343/893; 345/173, 177–178; 349/63; 455/566; 715/784
See application file for complete search history.

(56) References Cited

U.S. PATENT DOCUMENTS

| 3,912,880 A | * | 10/1975 | Powter | ...................... G01H 3/06 360/6 |
| 4,488,000 A | | 12/1984 | Glenn | |

(Continued)

FOREIGN PATENT DOCUMENTS

| CN | 101373415 | 2/2009 |
| CN | 101669088 | 3/2010 |

(Continued)

OTHER PUBLICATIONS

Liu et al., "Acoustic Wave Approach for Multi-Touch Tactile Sensing", Micro-NanoMechatronics and Human Science, MHS 2009. International Symposium, Nov. 9-11, 2009.

(Continued)

*Primary Examiner* — Lin Li
(74) *Attorney, Agent, or Firm* — Van Pelt, Yi & James LLP

(57) ABSTRACT

A touch input system is disclosed. The system includes a medium configured to receive a touch input. The system includes an antenna located substantially adjacent and parallel to at least a portion of the medium where the touch input may be received. The system includes a transmitter substantially coupled to the medium, wherein the transmitter is configured to propagate a propagating signal through the medium. The system includes a detector that detects a disturbance to the propagating signal by the touch input, wherein the detector is configured to output data indicating the disturbance of the propagating signal that is indicative of a user indication.

21 Claims, 6 Drawing Sheets

(51) Int. Cl.
*H01Q 1/24* (2006.01)
*G06F 3/046* (2006.01)

(56) References Cited

U.S. PATENT DOCUMENTS

| | | | |
|---|---|---|---|
| 4,529,959 A * | 7/1985 | Ito | G06F 3/045 |
| | | | 200/86 R |
| 4,594,695 A | 6/1986 | Garconnat | |
| 4,966,150 A | 10/1990 | Etienne | |
| 5,334,805 A * | 8/1994 | Knowles | G06F 3/0436 |
| | | | 178/18.04 |
| 5,451,723 A * | 9/1995 | Huang | G06F 3/0436 |
| | | | 178/18.04 |
| 5,563,849 A | 10/1996 | Hall et al. | |
| 5,573,077 A | 11/1996 | Knowles | |
| 5,591,945 A * | 1/1997 | Kent | G06F 3/0418 |
| | | | 178/18.04 |
| 5,635,643 A | 6/1997 | Maji | |
| 5,637,839 A | 6/1997 | Yamaguchi et al. | |
| 5,638,093 A * | 6/1997 | Takahashi | G06F 3/0436 |
| | | | 178/19.02 |
| 5,708,460 A | 1/1998 | Young et al. | |
| 5,739,479 A | 4/1998 | Davis-Cannon et al. | |
| 5,784,054 A | 7/1998 | Armstrong et al. | |
| 5,854,450 A | 12/1998 | Kent | |
| 5,883,457 A | 3/1999 | Rinde et al. | |
| 5,912,659 A | 6/1999 | Rutledge et al. | |
| 6,091,406 A | 7/2000 | Kambara et al. | |
| 6,232,960 B1 | 5/2001 | Goldman | |
| 6,236,391 B1 | 5/2001 | Kent | |
| 6,254,105 B1 | 7/2001 | Rinde et al. | |
| 6,262,946 B1 | 7/2001 | Khuri-Yakub | |
| 6,307,942 B1 | 10/2001 | Azima | |
| 6,473,075 B1 | 10/2002 | Gomes et al. | |
| 6,492,979 B1 | 12/2002 | Kent et al. | |
| 6,498,603 B1 | 12/2002 | Wallace | |
| 6,507,772 B1 | 1/2003 | Gomes | |
| 6,535,147 B1 | 3/2003 | Masters et al. | |
| 6,567,077 B2 | 5/2003 | Inoue et al. | |
| 6,630,929 B1 | 10/2003 | Adler et al. | |
| 6,633,280 B1 | 10/2003 | Matsumoto et al. | |
| 6,636,201 B1 | 10/2003 | Gomes et al. | |
| 6,788,296 B2 | 9/2004 | Ikeda et al. | |
| 6,798,403 B2 | 9/2004 | Kitada et al. | |
| 6,856,259 B1 | 2/2005 | Sharp | |
| 6,891,527 B1 | 5/2005 | Chapman et al. | |
| 6,922,642 B2 | 7/2005 | Sullivan | |
| 6,948,371 B2 | 9/2005 | Tanaka et al. | |
| 7,000,474 B2 | 2/2006 | Kent | |
| 7,006,081 B2 | 2/2006 | Kent et al. | |
| 7,116,315 B2 | 10/2006 | Sharp et al. | |
| 7,119,800 B2 | 10/2006 | Kent et al. | |
| 7,187,369 B1 | 3/2007 | Kanbara et al. | |
| 7,193,617 B1 | 3/2007 | Kanbara et al. | |
| 7,204,148 B2 | 4/2007 | Tanaka et al. | |
| 7,218,248 B2 | 5/2007 | Kong et al. | |
| 7,274,358 B2 | 9/2007 | Kent | |
| RE39,881 E | 10/2007 | Flowers | |
| 7,315,336 B2 | 1/2008 | North et al. | |
| 7,345,677 B2 | 3/2008 | Ing et al. | |
| 7,411,581 B2 | 8/2008 | Hardie-Bick | |
| 7,456,825 B2 | 11/2008 | Kent et al. | |
| 7,511,711 B2 | 3/2009 | Ing et al. | |
| 7,545,365 B2 | 6/2009 | Kent et al. | |
| 7,554,246 B2 | 6/2009 | Maruyama et al. | |
| 7,583,255 B2 | 9/2009 | Ing | |
| 7,649,807 B2 | 1/2010 | Ing | |
| 7,683,894 B2 | 3/2010 | Kent | |
| 7,880,721 B2 | 2/2011 | Suzuki et al. | |
| 7,920,133 B2 | 4/2011 | Tsumura et al. | |
| 8,059,107 B2 | 11/2011 | Hill | |
| 8,085,124 B2 | 12/2011 | Ing | |
| 8,194,051 B2 | 6/2012 | Wu | |
| 8,228,121 B2 | 7/2012 | Benhamouda et al. | |
| 8,237,676 B2 | 8/2012 | Duheille et al. | |
| 8,319,752 B2 | 11/2012 | Hardie-Bick | |
| 8,325,159 B2 | 12/2012 | Kent et al. | |
| 8,358,277 B2 | 1/2013 | Mosby et al. | |
| 8,378,974 B2 | 2/2013 | Aroyan et al. | |
| 8,392,486 B2 | 3/2013 | Ing | |
| 8,418,083 B1 | 4/2013 | Lundy | |
| 8,427,423 B2 | 4/2013 | Tsumura | |
| 8,436,806 B2 | 5/2013 | Almalki et al. | |
| 8,436,808 B2 | 5/2013 | Chapman et al. | |
| 8,493,332 B2 | 7/2013 | D'Souza | |
| 8,519,982 B2 * | 8/2013 | Camp, Jr. | G06F 3/0436 |
| | | | 345/173 |
| 8,576,202 B2 | 11/2013 | Tanaka et al. | |
| 8,619,063 B2 | 12/2013 | Chaine et al. | |
| 8,638,318 B2 | 1/2014 | Gao et al. | |
| 8,648,815 B2 | 2/2014 | Kent et al. | |
| 8,659,579 B2 | 2/2014 | Nadjar et al. | |
| 8,670,290 B2 | 3/2014 | Aklil et al. | |
| 8,681,128 B2 | 3/2014 | Scharff et al. | |
| 8,692,809 B2 | 4/2014 | D'souza | |
| 8,692,810 B2 | 4/2014 | Ing | |
| 8,692,812 B2 | 4/2014 | Hecht | |
| 8,730,213 B2 | 5/2014 | D'Souza et al. | |
| 8,749,517 B2 | 6/2014 | Aklil | |
| 8,787,599 B2 | 7/2014 | Grattan | |
| 8,823,685 B2 | 9/2014 | Scharff et al. | |
| 8,854,339 B2 | 10/2014 | Kent et al. | |
| 8,890,852 B2 | 11/2014 | Aroyan et al. | |
| 8,896,429 B2 | 11/2014 | Chaine | |
| 8,896,564 B2 | 11/2014 | Scharff et al. | |
| 8,917,249 B1 | 12/2014 | Buuck et al. | |
| 8,941,624 B2 | 1/2015 | Kent et al. | |
| 8,946,973 B2 | 2/2015 | Pelletier | |
| 8,994,696 B2 | 3/2015 | Berget et al. | |
| 9,030,436 B2 | 5/2015 | Ikeda | |
| 9,041,662 B2 | 5/2015 | Harris | |
| 9,046,959 B2 | 6/2015 | Schevin et al. | |
| 9,046,966 B2 | 6/2015 | D'Souza | |
| 9,058,071 B2 | 6/2015 | Esteve | |
| 9,099,971 B2 | 8/2015 | Lynn et al. | |
| 9,189,109 B2 | 11/2015 | Sheng | |
| 9,250,742 B1 * | 2/2016 | Usey | G06F 3/03545 |
| 9,348,468 B2 | 5/2016 | Altekar | |
| 9,477,350 B2 | 10/2016 | Sheng | |
| 9,594,450 B2 | 3/2017 | Lynn | |
| 9,983,718 B2 | 5/2018 | Sheng | |
| 2001/0050677 A1 | 12/2001 | Tosaya | |
| 2002/0036621 A1 * | 3/2002 | Liu | G06F 3/03545 |
| | | | 345/173 |
| 2002/0047833 A1 | 4/2002 | Kitada | |
| 2002/0185981 A1 * | 12/2002 | Dietz | G06F 3/038 |
| | | | 315/169.3 |
| 2003/0161484 A1 | 8/2003 | Kanamori | |
| 2003/0164820 A1 | 9/2003 | Kent | |
| 2003/0189745 A1 | 10/2003 | Kikuchi | |
| 2003/0197691 A1 | 10/2003 | Fujiwara et al. | |
| 2003/0206162 A1 | 11/2003 | Roberts | |
| 2004/0133366 A1 | 7/2004 | Sullivan | |
| 2004/0160421 A1 | 8/2004 | Sullivan | |
| 2004/0183788 A1 * | 9/2004 | Kurashima | G06F 3/03547 |
| | | | 345/173 |
| 2004/0203594 A1 | 10/2004 | Kotzin | |
| 2004/0239649 A1 | 12/2004 | Ludtke | |
| 2004/0246239 A1 | 12/2004 | Knowles et al. | |
| 2005/0063553 A1 | 3/2005 | Ozawa | |
| 2005/0146511 A1 | 7/2005 | Hill | |
| 2005/0146512 A1 | 7/2005 | Hill | |
| 2005/0174338 A1 | 8/2005 | Ing | |
| 2005/0226455 A1 | 10/2005 | Aubauer | |
| 2005/0248540 A1 | 11/2005 | Newton | |
| 2006/0071912 A1 | 4/2006 | Hill et al. | |
| 2006/0109261 A1 | 5/2006 | Chou | |
| 2006/0114233 A1 | 6/2006 | Radivojevic et al. | |
| 2006/0139339 A1 | 6/2006 | Pechman | |
| 2006/0139340 A1 | 6/2006 | Geaghan | |
| 2006/0152499 A1 * | 7/2006 | Roberts | G06F 3/0436 |
| | | | 345/173 |
| 2006/0166681 A1 | 7/2006 | Lohbihler | |
| 2006/0197753 A1 | 9/2006 | Hotelling | |

(56) References Cited

U.S. PATENT DOCUMENTS

| | | |
|---|---|---|
| 2006/0262104 A1 | 11/2006 | Sullivan et al. |
| 2006/0279548 A1 | 12/2006 | Geaghan |
| 2006/0284841 A1 | 12/2006 | Hong |
| 2007/0019825 A1 | 1/2007 | Marumoto |
| 2007/0109274 A1 | 5/2007 | Reynolds |
| 2007/0165009 A1* | 7/2007 | Sakurai ............... G06F 3/0412 345/177 |
| 2007/0171212 A1* | 7/2007 | Sakurai ............... G06F 3/0412 345/177 |
| 2007/0183520 A1 | 8/2007 | Kim |
| 2007/0211022 A1 | 9/2007 | Boillot |
| 2007/0214462 A1* | 9/2007 | Boillot ............... G06F 3/0304 719/328 |
| 2007/0229479 A1 | 10/2007 | Choo et al. |
| 2007/0240913 A1* | 10/2007 | Schermerhorn ...... G06F 3/0436 178/18.04 |
| 2007/0279398 A1 | 12/2007 | Tsumura et al. |
| 2008/0018618 A1 | 1/2008 | Hill et al. |
| 2008/0030479 A1 | 2/2008 | Lowles et al. |
| 2008/0062151 A1 | 3/2008 | Kent |
| 2008/0081671 A1 | 4/2008 | Wang et al. |
| 2008/0105470 A1 | 5/2008 | Van De Ven et al. |
| 2008/0111788 A1 | 5/2008 | Rosenberg et al. |
| 2008/0169132 A1 | 7/2008 | Ding |
| 2008/0174565 A1* | 7/2008 | Chang ............... G06F 3/03547 345/173 |
| 2008/0198145 A1 | 8/2008 | Knowles et al. |
| 2008/0231612 A1 | 9/2008 | Hill et al. |
| 2008/0259030 A1 | 10/2008 | Holtzman |
| 2008/0266266 A1 | 10/2008 | Kent |
| 2008/0284755 A1 | 11/2008 | Hardie-Bick |
| 2009/0009488 A1 | 1/2009 | D'Souza |
| 2009/0103853 A1 | 4/2009 | Daniel |
| 2009/0116661 A1 | 5/2009 | Hetherington |
| 2009/0146533 A1 | 6/2009 | Leskinen et al. |
| 2009/0160728 A1* | 6/2009 | Emrick ............... H01Q 1/243 343/893 |
| 2009/0167704 A1 | 7/2009 | Terlizzi |
| 2009/0237372 A1 | 9/2009 | Kim et al. |
| 2009/0271004 A1 | 10/2009 | Zecchin et al. |
| 2009/0273583 A1 | 11/2009 | Norhammar |
| 2009/0309853 A1 | 12/2009 | Hildebrandt |
| 2009/0315848 A1* | 12/2009 | Ku ............... G06F 3/0416 345/173 |
| 2010/0026667 A1* | 2/2010 | Bernstein ............... 345/177 |
| 2010/0027810 A1 | 2/2010 | Marton |
| 2010/0044121 A1 | 2/2010 | Simon et al. |
| 2010/0045635 A1* | 2/2010 | Soo ............... 345/178 |
| 2010/0079264 A1 | 4/2010 | Hoellwarth |
| 2010/0117933 A1 | 5/2010 | Gothard |
| 2010/0117993 A1* | 5/2010 | Kent ............... G06F 3/0418 345/177 |
| 2010/0141408 A1 | 6/2010 | Doy |
| 2010/0156818 A1 | 6/2010 | Burrough et al. |
| 2010/0165215 A1* | 7/2010 | Shim ............... H04N 5/4403 348/734 |
| 2010/0185989 A1 | 7/2010 | Shiplacoff et al. |
| 2010/0188356 A1 | 7/2010 | Vu et al. |
| 2010/0245265 A1* | 9/2010 | Sato ............... G06F 1/1626 345/173 |
| 2010/0269040 A1 | 10/2010 | Lee |
| 2010/0277431 A1 | 11/2010 | Klinghult |
| 2010/0309139 A1 | 12/2010 | Ng |
| 2010/0315373 A1 | 12/2010 | Steinhauser et al. |
| 2010/0321312 A1 | 12/2010 | Han et al. |
| 2010/0321325 A1* | 12/2010 | Springer ............... G06F 3/041 345/174 |
| 2010/0321337 A1 | 12/2010 | Liao et al. |
| 2011/0001707 A1 | 1/2011 | Faubert |
| 2011/0001708 A1 | 1/2011 | Sleeman |
| 2011/0012717 A1 | 1/2011 | Pance et al. |
| 2011/0013785 A1* | 1/2011 | Kim ............... H03G 3/32 381/107 |
| 2011/0018695 A1 | 1/2011 | Bells et al. |
| 2011/0025649 A1 | 2/2011 | Sheikhzadeh Nadjar |
| 2011/0042152 A1 | 2/2011 | Wu |
| 2011/0057903 A1 | 3/2011 | Yamano et al. |
| 2011/0063228 A1 | 3/2011 | St. Pierre et al. |
| 2011/0080350 A1 | 4/2011 | Almalki et al. |
| 2011/0084912 A1 | 4/2011 | Almalki |
| 2011/0084937 A1 | 4/2011 | Chang |
| 2011/0155479 A1 | 6/2011 | Oda |
| 2011/0156967 A1* | 6/2011 | Oh et al. ............... 343/702 |
| 2011/0167391 A1 | 7/2011 | Momeyer et al. |
| 2011/0175813 A1 | 7/2011 | Sarwar et al. |
| 2011/0182443 A1 | 7/2011 | Gant |
| 2011/0191680 A1 | 8/2011 | Chae |
| 2011/0199342 A1 | 8/2011 | Vartanian et al. |
| 2011/0213223 A1 | 9/2011 | Kruglick |
| 2011/0222372 A1 | 9/2011 | O'Donovan |
| 2011/0225549 A1 | 9/2011 | Kim |
| 2011/0234545 A1 | 9/2011 | Tanaka |
| 2011/0260990 A1 | 10/2011 | Ali et al. |
| 2011/0279382 A1 | 11/2011 | Pertuit |
| 2011/0298670 A1* | 12/2011 | Jung ............... H01Q 1/243 343/702 |
| 2011/0300845 A1 | 12/2011 | Lee |
| 2011/0304577 A1 | 12/2011 | Brown |
| 2011/0316784 A1 | 12/2011 | Bisutti |
| 2011/0316790 A1* | 12/2011 | Ollila ............... G06F 3/04883 345/173 |
| 2012/0001875 A1 | 1/2012 | Li et al. |
| 2012/0002820 A1 | 1/2012 | Leichter |
| 2012/0007837 A1 | 1/2012 | Kent |
| 2012/0026114 A1 | 2/2012 | Lee et al. |
| 2012/0030628 A1 | 2/2012 | Lee |
| 2012/0032928 A1 | 2/2012 | Alberth |
| 2012/0050230 A1* | 3/2012 | Harris ............... G06F 3/0433 345/178 |
| 2012/0062564 A1 | 3/2012 | Miyashita et al. |
| 2012/0068939 A1 | 3/2012 | Pemberton-Pigott |
| 2012/0068970 A1 | 3/2012 | Pemberton-Pigott |
| 2012/0081337 A1 | 4/2012 | Camp et al. |
| 2012/0088548 A1 | 4/2012 | Yun et al. |
| 2012/0092964 A1* | 4/2012 | Badiey ............... G01S 5/30 367/127 |
| 2012/0120031 A1 | 5/2012 | Thuillier |
| 2012/0126962 A1* | 5/2012 | Ujii ............... G06F 3/0414 340/407.2 |
| 2012/0127088 A1* | 5/2012 | Pance ............... G06F 3/016 345/173 |
| 2012/0140954 A1 | 6/2012 | Ranta |
| 2012/0144293 A1 | 6/2012 | Kim |
| 2012/0149437 A1 | 6/2012 | Zurek |
| 2012/0188194 A1 | 7/2012 | Sulem |
| 2012/0188889 A1 | 7/2012 | Sambhwani et al. |
| 2012/0194466 A1 | 8/2012 | Posamentier |
| 2012/0200517 A1 | 8/2012 | Nikolovski |
| 2012/0206154 A1 | 8/2012 | Pant |
| 2012/0229407 A1 | 9/2012 | Harris et al. |
| 2012/0232834 A1 | 9/2012 | Roche et al. |
| 2012/0235866 A1* | 9/2012 | Kim ............... H01Q 1/243 343/700 MS |
| 2012/0242603 A1 | 9/2012 | Engelhardt |
| 2012/0270605 A1 | 10/2012 | Garrone |
| 2012/0272089 A1 | 10/2012 | Hatfield et al. |
| 2012/0278490 A1* | 11/2012 | Sennett ............... H04W 4/005 709/227 |
| 2012/0282944 A1 | 11/2012 | Zhao |
| 2012/0300956 A1 | 11/2012 | Horii |
| 2012/0306823 A1 | 12/2012 | Pance |
| 2013/0011144 A1 | 1/2013 | Amiri Farahani |
| 2013/0050133 A1 | 2/2013 | Brakensiek |
| 2013/0050154 A1 | 2/2013 | Guy |
| 2013/0057491 A1 | 3/2013 | Chu |
| 2013/0059532 A1* | 3/2013 | Mahanfar ............... H04B 5/0031 455/41.1 |
| 2013/0082970 A1 | 4/2013 | Frey |
| 2013/0127755 A1 | 5/2013 | Lynn |
| 2013/0141365 A1 | 6/2013 | Lynn |
| 2013/0147768 A1 | 6/2013 | Aroyan |
| 2013/0194208 A1 | 8/2013 | Miyanaka |

(56) References Cited

U.S. PATENT DOCUMENTS

| | | |
|---|---|---|
| 2013/0222274 A1 | 8/2013 | Mori |
| 2013/0234995 A1 | 9/2013 | Son |
| 2013/0249831 A1 | 9/2013 | Harris |
| 2014/0028576 A1 | 1/2014 | Shahparnia |
| 2014/0078070 A1 | 3/2014 | Armstrong-Muntner |
| 2014/0078086 A1 | 3/2014 | Bledsoe |
| 2014/0078109 A1 | 3/2014 | Armstrong-Muntner |
| 2014/0078112 A1 | 3/2014 | Sheng |
| 2014/0185834 A1 | 7/2014 | Fromel et al. |
| 2014/0247230 A1 | 9/2014 | Sheng |
| 2014/0247250 A1 | 9/2014 | Sheng |
| 2014/0317722 A1 | 10/2014 | Tartz |
| 2014/0362055 A1 | 12/2014 | Altekar |
| 2014/0368464 A1 | 12/2014 | Singnurkar |
| 2015/0002415 A1 | 1/2015 | Lee |
| 2015/0009185 A1 | 1/2015 | Shi |
| 2015/0109239 A1 | 4/2015 | Mao |
| 2015/0199035 A1 | 7/2015 | Chang |
| 2015/0253895 A1 | 9/2015 | Kim |
| 2015/0346850 A1 | 12/2015 | Vandermeijden |
| 2016/0070404 A1 | 3/2016 | Kerr |
| 2016/0091308 A1 | 3/2016 | Oliaei |
| 2016/0162044 A1 | 6/2016 | Ciou |
| 2016/0179249 A1 | 6/2016 | Ballan |
| 2016/0209944 A1 | 7/2016 | Shim |
| 2016/0282965 A1 | 9/2016 | Jensen |
| 2016/0349922 A1 | 12/2016 | Choi |
| 2017/0010697 A1 | 1/2017 | Jiang |
| 2017/0083164 A1 | 3/2017 | Sheng |
| 2018/0032211 A1 | 2/2018 | King |

FOREIGN PATENT DOCUMENTS

| | | |
|---|---|---|
| EP | 2315101 | 4/2011 |
| EP | 2315101 A1 | 4/2011 |
| FR | 2948787 A1 | 2/2011 |
| KR | 1020040017272 | 2/2004 |
| KR | 1020050092179 | 2/2004 |
| KR | 1020070005580 | 1/2007 |
| KR | 1020080005990 | 1/2008 |
| KR | 20110001839 | 1/2011 |
| WO | WO-03005292 | 1/2003 |
| WO | 2006115947 A2 | 11/2006 |
| WO | 2006115947 A3 | 11/2006 |
| WO | 2011010037 A1 | 1/2011 |
| WO | 2011024434 A1 | 3/2011 |
| WO | 2011048433 A1 | 4/2011 |
| WO | 2011051722 | 5/2011 |
| WO | 2012010912 | 1/2012 |
| WO | WO-2014209757 A1 | 12/2014 |
| WO | WO-2015027017 | 2/2015 |

OTHER PUBLICATIONS

T Benedict et al. 'The joint estimation of signal and noise from the sum envelope.' IEEE Transactions on Information Theory 13.3, pp. 447-454. Jul. 1, 1967.

\* cited by examiner

TOUCH INPUT DETECTOR WITH AN INTEGRATED ANTENNA

CROSS REFERENCE TO OTHER APPLICATIONS

This application claims priority to U.S. Provisional Patent Application No. 61/561,656 entitled TOUCH SCREEN SYSTEM WITH INTEGRATED ANTENNA filed Nov. 18, 2011 which is incorporated herein by reference for all purposes.

BACKGROUND OF THE INVENTION

Devices such as smartphones and tablet computers often include an antenna to enable wireless communication. For example, wireless communication technology such as Wi-Fi, cellular, and Bluetooth utilized by these devices rely on one or more antennas of the device to transmit and receive wireless signals. Often the most ideal antenna configuration requires a large area on a device where an antenna can be placed. Due to the radio frequency signals that needs to be emitted and received by an antenna, the antenna often cannot be placed near other conductive materials that may interfere, be interfered, and/or block desired signals to be transmitted/received by the antenna. The largest area of a device typically includes a front touch screen area and a rear area on the back of the device. In some cases it is difficult to place a large antenna on the rear area due to other components located in the area, removable battery door, and/or a metal casing that blocks antenna signals.

The front touch screen area is a potential candidate for antenna placement. Various technologies have been used to detect a touch input on a display area. The most popular technologies today include capacitive and resistive touch detection technology. Using resistive touch technology, often a glass panel is coated with multiple conductive layers that register touches when physical pressure is applied to the layers to force the layers to make physical contact. Using capacitive touch technology, often a glass panel is coated with material that can hold an electrical charge sensitive to a human finger. By detecting the change in the electrical charge due to a touch, a touch location can be detected. However, with resistive and capacitive touch detection technologies, the glass screen is required to be coated with a material that reduces the clarity of the glass screen. Additionally, because the entire glass screen is required to be coated with a material, manufacturing and component costs can become prohibitively expensive as larger screens are desired. Thus with resistive and capacitive touch detection technology, a conductive layer that may interfere, be interfered, and/or block antenna signals covers a large portion of the touch screen area of the device. Therefore there exists a need for a better way to place a large antenna within a touch input device.

BRIEF DESCRIPTION OF THE DRAWINGS

Various embodiments of the invention are disclosed in the following detailed description and the accompanying drawings.

DETAILED DESCRIPTION

Figure 1:
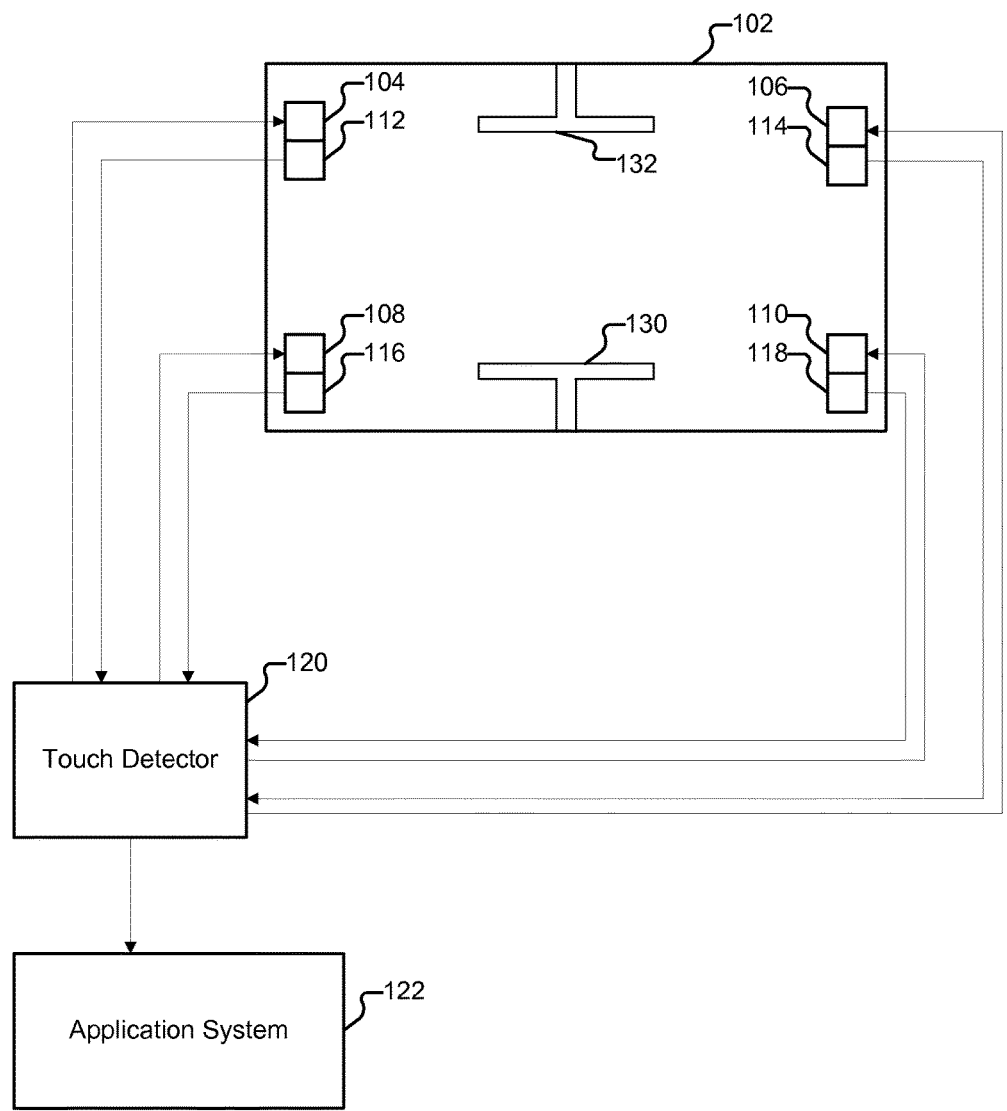
FIG. 1 is a block diagram illustrating an embodiment of a system for detecting a surface disturbance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Many touchscreen-enabled mobile/portable devices cannot use its touchscreen display area for placement of one or more radio frequency antennas because the indium tin oxide (or other transparent conductor) layers that are used as touch sensors act as a lossy ground plane that prevents any antenna placed too close to these layers from efficiently transmitting and receiving signals. This constraint may limit the placement of the various antennas needed for the device to the space-constrained areas around the border of the display where the conductive layers are not present. This also may prevent the touch input area from covering substantially the entire surface of the device. Indium tin oxide (ITO) is often used as a semi-transparent conductor to detect a touch input (e.g., capacitive sensing and resistive sensing touchscreens). ITO or another transparent conductor typically covers the entire area of a display area at or near the surface of the display.

A touch input device with an integrated antenna is disclosed. In some embodiments, a system includes a medium configured to receive a touch input. For example, the system includes a touch screen display. The system includes an antenna located substantially adjacent and parallel to at least a portion of the medium where the touch input may be received. For example, a substantially transparent antenna is placed under the surface configured to receive the touch input. The system includes a transmitter substantially coupled to the medium. The transmitter is configured to propagate a propagating signal through the medium and the propagating signal is disturbed by the touch input that disturbs the propagating signal. The system includes a detector that detects the disturbed propagating signal. The detector outputs data indicating a disturbance of the propagating signal that is indicative of a user indication. For example, the disturbance is processed to determine a location on a surface of the medium where the user indication was provided.

In some embodiments, a user touch input on the glass surface of a display screen is detected. In some embodiments, a signal such as an acoustic or ultrasonic signal is propagated freely through a propagating medium with a surface using a transmitter coupled to the medium. When the surface is touched, the propagated signal is disturbed (e.g., the touch causes an interference with the propagated signal). In some embodiments, the disturbed signal is received at a sensor coupled to the propagating medium. By processing the received signal and comparing it against an expected signal without the disturbance, a location on the surface associated with the touch input is at least in part determined. For example, the disturbed signal is received at a plurality of sensors and a relative time difference between when the disturbed signal was received at different sensors is used to determine the location on the surface. In various embodiments, the touch includes a physical contact and/or close proximity (e.g., hovering) to a surface using a human finger, pen, pointer, stylus, and/or any other body parts or objects that can be used to contact or disturb the surface. In some embodiments, the touch includes an input gesture and/or a multi-touch input.

In some embodiments, the disturbed signal is used to determine one or more of the following associated with a touch input: a gesture, a coordinate position, a time, a time frame, a direction, a velocity, a force magnitude, a proximity magnitude, a pressure, a size, and other measurable or derived parameters. In some embodiments, by detecting disturbances of a freely propagated signal, touch input detection technology can be applied to larger surface regions with less or no additional cost due to a larger surface region as compared to certain previous touch detection technologies. Additionally, the optical transparency of a touch screen may not have to be affected as compared to resistive and capacitive touch technologies. Merely by way of example, the touch detection described herein can be applied to a variety of objects such as a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces.

In some embodiments, by utilizing a touchscreen technology that is capable of detecting touch inputs without utilizing large conductive layers at or near the surface of the display, a conductive layer may be utilized at or near the surface of the display to form one or more antennas. In some embodiments, patterned antennas are placed on a transparent conductive layer at or near a medium with a touch input surface. In some embodiments, antennas include a first conductive element that has a physical separation from one or more other conductive elements (e.g., a ground plane acts as the main second element). In some embodiments, by not utilizing a conductive layer to detect touch input locations and utilizing a conductive layer to form one element of the antenna(s), enough physical separation is created between the first antenna element (e.g., formed by the conductive layer) and another conductive structure (e.g., the ground plane of the device motherboard or display panel) to form an antenna. A PIFA (planar inverted-F) antenna design may be utilized. For example, "microstrip antenna" that is a PIFA style of antenna mounted over a ground plane may be utilized. In some embodiments, the antenna may include a fractal design, multiple-input and multiple-output (MIMO) design, or phased array (beam forming) design. In some embodiments, the antenna may include substantially transparent (e.g., semi-transparent) conductors made out of carbon nanotube or silver-doped ink technologies.

FIG. 1 is a block diagram illustrating an embodiment of a system for detecting a surface disturbance. In some embodiments, the system shown in FIG. 1 is included in a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces. Propagating signal medium 102 is coupled to transmitters 104, 106, 108, and 110 and sensors 112, 114, 116, and 118. In various embodiments, the propagating medium includes one or more of the following: panel, table, glass, screen, door, floor, whiteboard, glass, plastic, wood, steel, metal, semiconductor, insulator, conductor, and any medium that is able to propagate an acoustic or ultrasonic signal. For example, medium 102 is glass of a display screen. A first surface of medium 102 includes a surface area where a user may touch to provide a selection input and a substantially opposite surface of medium 102 is coupled to the transmitters and sensors shown in FIG. 1. In various embodiments, a surface of medium 102 is substantially flat, curved, or combinations thereof and may be configured in a variety of shapes such as rectangular, square, oval, circular, trapezoidal, annular, or any combination of these, and the like.

Examples of transmitters 104, 106, 108, and 110 include piezoelectric transducers, electromagnetic transducers, transmitters, sensors and/or any other transmitters and transducers capable of propagating a signal through medium 102. Examples of sensors 112, 114, 116, and 118 include piezoelectric transducers, electromagnetic transducers, transmitters and/or any other sensors and transducers capable of detecting a signal on medium 102. In some embodiments, the transmitters and sensors shown in FIG. 1 are coupled to medium 102 in a manner that allows a user input to be detected in a predetermined region of medium 102. Although four transmitters and four sensors are shown, any number of transmitters and any number of sensors may be used in other embodiments. For example, two transmitters and three sensors may be used. In some embodiments, a single transducer acts as both a transmitter and a sensor. For example, transmitter 104 and sensor 112 represent a single piezoelectric transducer. In the example shown, transmitter 104 may propagate a signal through medium 102. Sensors 112, 114, 116, and 118 receive the propagated signal. In another embodiment, the transmitters/sensors in FIG. 1 are included in a flexible cable coupled to medium 102 via an encapsulant and/or glue material and/or fasteners.

Touch detector 120 is connected to the transmitters and sensors shown in FIG. 1. In some embodiments, detector 120 includes one or more of the following: an integrated circuit chip, a printed circuit board, a processor, and other electrical components and connectors. Detector 120 determines and sends a signal to be propagated by transmitters 104, 106, 108, and 110. Detector 120 also receives the signal detected by sensors 112, 114, 116, and 118. The received signals are processed by detector 120 to determine whether a disturbance associated with a user input has been detected at a location on a surface of medium 102 associated with the disturbance. Detector 120 is in communication with application system 122. Application system 122 uses information provided by detector 120. For example, application system 122 receives from detector 120 a coordinate associated with a user touch input that is used by application system 122 to control a software application of application system 122. In some embodiments, application system 122 includes a processor and/or memory/storage. In other embodiments, detector 120 and application system 122 are at least in part included/processed in a single processor. An example of data provided by detector 120 to application system 122 includes one or more of the following associated with a user indication: a location coordinate of a surface of medium 102, a gesture, simultaneous user indications (e.g., multi-touch input), a time, a status, a direction, a velocity, a force magnitude, a proximity magnitude, a pressure, a size, and other measurable or derived information.

Antenna 130 and antenna 132 are located substantially parallel and adjacent to medium 102. For example, first surface of medium 102 faces a user and is configured to receive a touch input and a second surface substantially opposite the first surface is adjacent to antennas 130 and 132 (e.g., antennas 130 and 132 are coupled to the second surface). In some embodiments, antennas 130 and 132 are coupled to a surface of medium 102 that is the same surface as the surface coupled to transmitters 104-110 and/or sensors 112-118. In some embodiments, a display screen is located substantially parallel to medium 102 and medium 102 functions as a transparent cover of the display screen. In some embodiments, at least a portion of medium 102 is a display screen surface. In some embodiments, at least a portion of antennas 130 and 132 are positioned over a display screen. For example, the antennas are made of a transparent conductive material that allows a user to view a display screen located beneath the antennas. In some embodiments, antenna 130 and antenna 132 are connected to transmitters and/or receivers that transmit/receive radio frequency signals. Although the example of FIG. 1 shows two antennas, any number of antennas may exist in various embodiments. The shape and design of antenna 130 and antenna 132 are merely examples that have been simplified to illustrate the embodiment clearly. Other antenna shapes and designs may be utilized in various other embodiments.

In some embodiments, antenna 130 and antenna 132 are substantially transparent (e.g., semi-transparent). In some embodiments, a ground plane of a circuit board (e.g., motherboard) coupled to antenna 130 and/or antenna 132 functions as a conductive element of antenna 130 and/or antenna 132. In some embodiments, a display panel coupled to antenna 130 and/or antenna 132 functions as a conductive element of antenna 130 and/or antenna 132. In some embodiments, antenna 130 and/or antenna 132 is one or more of the following types of antennas: a cellular antenna, a Wi-Fi antenna, a Bluetooth antenna, and a near field communication antenna. In some embodiments, antenna 130 and/or antenna 132 is a PIFA (planar inverted-F) antenna. In some embodiments, antenna 130 and/or antenna 132 is a microstrip antenna. In some embodiments, antenna 130 and/or antenna 132 is at least a part of a multiple-input and multiple-output (MIMO) and/or phased array (e.g., beam forming) antenna configuration. In some embodiments, at least a portion of antenna 130 and/or antenna 132 is made of ITO. In some embodiments, at least a portion of antenna 130 and/or antenna 132 is made of a carbon nanotube, nanowire, and/or nanomesh. In some embodiments, at least a portion of antenna 130 and/or antenna 132 is made of silver-doped ink.

Figure 2:
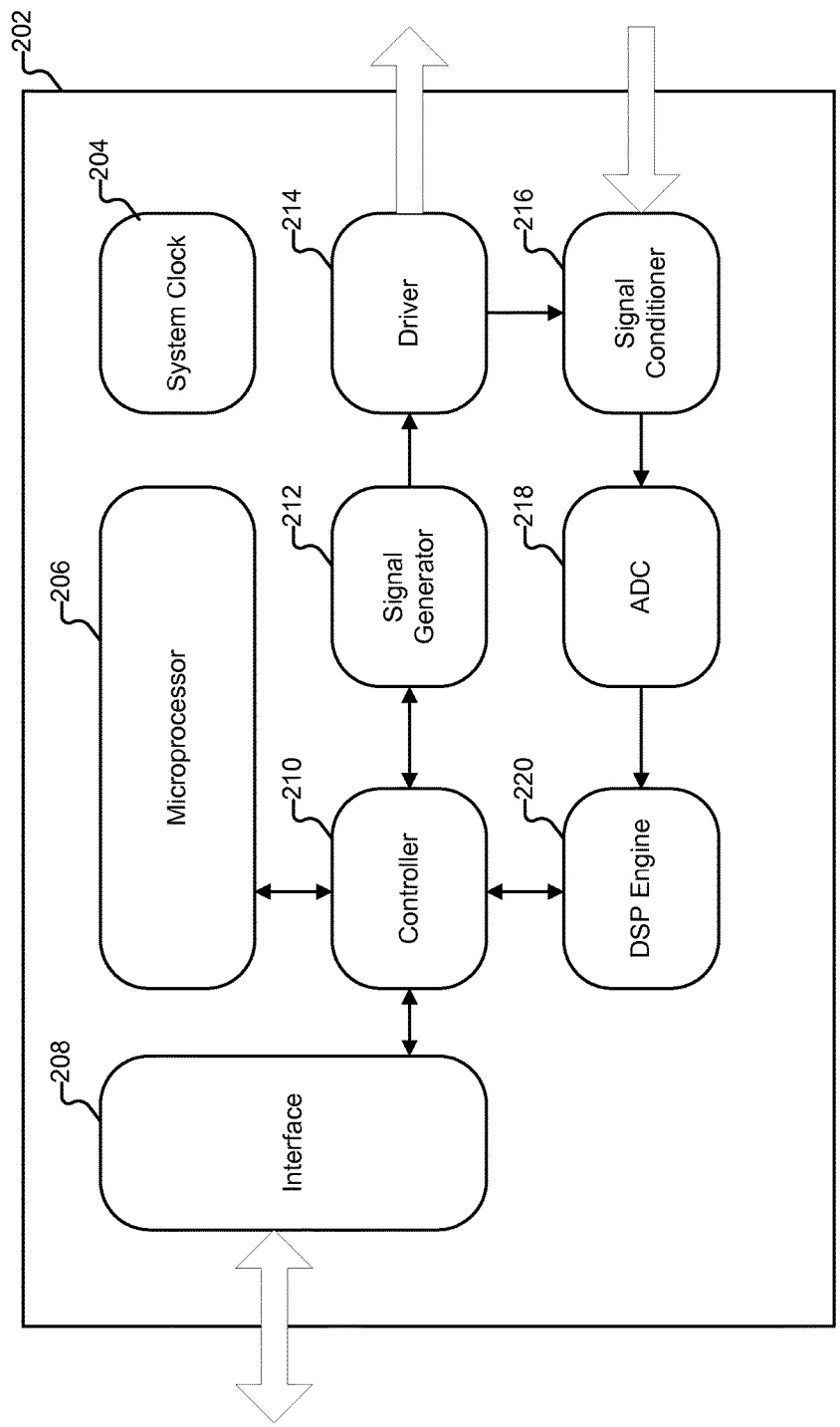
FIG. 2 is a block diagram illustrating an embodiment of a system for detecting a touch input.

FIG. 2 is a block diagram illustrating an embodiment of a system for detecting a touch input. In some embodiments, touch detector 202 is included in touch detector 120 of FIG. 1. In some embodiments, the system of FIG. 2 is integrated in an integrated circuit chip. Touch detector 202 includes system clock 204 that provides a synchronous system time source to one or more other components of detector 202. Controller 210 controls data flow and/or commands between microprocessor 206, interface 208, DSP engine 220, and signal generator 212. In some embodiments, microprocessor 206 processes instructions and/or calculations that can be used to program software/firmware and/or process data of detector 202. In some embodiments, a memory is coupled to microprocessor 206 and is configured to provide microprocessor 206 with instructions. Signal generator 212 generates a signal to be used to propagate a signal such as a signal propagated by transmitter 104 of FIG. 1. For example, signal generator 212 generates a pseudorandom binary sequence signal. Driver 214 receives the signal from generator 212 and drives one or more transmitters, such as transmitters 104, 106, 108, and 110 of FIG. 1, to propagate a signal through a medium.

A signal detected from a sensor such as sensor 112 of FIG. 1 is received by detector 202 and signal conditioner 216 conditions (e.g., filters) the received analog signal for further processing. For example, signal conditioner 216 receives the signal outputted by driver 214 and performs echo cancellation of the signal received by signal conditioner 216. The conditioned signal is converted to a digital signal by analog-to-digital converter 218. The converted signal is processed by digital signal processor engine 220. For example, DSP engine 220 correlates the converted signal against a reference signal. The result of the correlation may be used by microprocessor 206 to determine a location associated with a user touch input. In some embodiments, the DSP engine determines an amplitude change associated with the converted signal and a reference signal. The amplitude change may be used by microprocessor 206 to determine a force associated with a user touch input. Interface 208 provides an interface for microprocessor 206 and controller 210 that allows an external component to access and/or control detector 202. For example, interface 208 allows detector 202 to communicate with application system 122 of FIG. 1 and provides the application system with location information associated with a user touch input.

Figure 3:
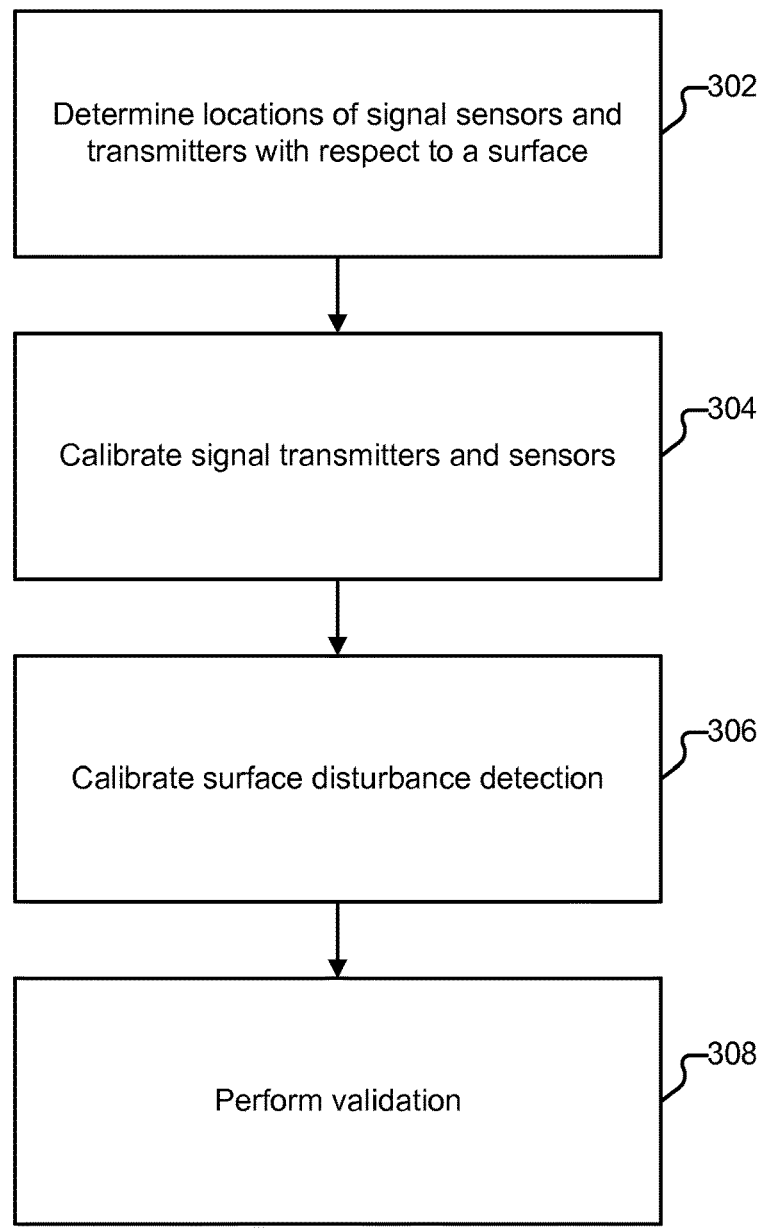
FIG. 3 is a flow chart illustrating an embodiment of a process for calibrating and validating touch detection.

FIG. 3 is a flow chart illustrating an embodiment of a process for calibrating and validating touch detection. In some embodiments, the process of FIG. 3 is used at least in part to calibrate and validate the system of FIG. 1 and/or the system of FIG. 2. At 302, locations of signal transmitters and sensors with respect to a surface are determined. For example, locations of transmitters and sensors shown in FIG. 1 are determined with respect to their location on a surface of medium 102. In some embodiments, determining the locations includes receiving location information. In various embodiments, one or more of the locations may be fixed and/or variable.

At 304, signal transmitters and sensors are calibrated. In some embodiments, calibrating the transmitter includes calibrating a characteristic of a signal driver and/or transmitter (e.g., strength). In some embodiments, calibrating the sensor includes calibrating a characteristic of a sensor (e.g., sensitivity). In some embodiments, the calibration of 304 is performed to optimize the coverage and improve signal-to-noise transmission/detection of a signal (e.g., acoustic or ultrasonic) to be propagated through a medium and/or a disturbance to be detected. For example, one or more components of the system of FIG. 1 and/or the system of FIG. 2 are tuned to meet a signal-to-noise requirement. In some embodiments, the calibration of 304 depends on the size and type of a transmission/propagation medium and geometric configuration of the transmitters/sensors. In some embodiments, the calibration of step 304 includes detecting a failure or aging of a transmitter or sensor. In some embodiments, the calibration of step 304 includes cycling the transmitter and/or receiver. For example, to increase the stability and reliability of a piezoelectric transmitter and/or receiver, a burn-in cycle is performed using a burn-in signal. In some embodiments, the step of 304 includes configuring at least one sensing device within a vicinity of a predetermined spatial region to capture an indication associated with a disturbance using the sensing device. The disturbance is caused in a selected portion of the input signal corresponding to a selection portion of the predetermined spatial region.

At 306, surface disturbance detection is calibrated. In some embodiments, a test signal is propagated through a medium such as medium 102 of FIG. 1 to determine an expected sensed signal when no disturbance has been applied. In some embodiments, a test signal is propagated through a medium to determine a sensed signal when one or more predetermined disturbances (e.g., predetermined touch) are applied at a predetermined location. Using the sensed signal, one or more components may be adjusted to calibrate the disturbance detection.

At 308, a validation of a touch detection system is performed. For example, the system of FIG. 1 and/or FIG. 2 is testing using predetermined disturbance patterns to determine detection accuracy, detection resolution, multi-touch detection, and/or response time. If the validation fails, the process of FIG. 3 may be at least in part repeated and/or one or more components may be adjusted before performing another validation.

Figure 4:
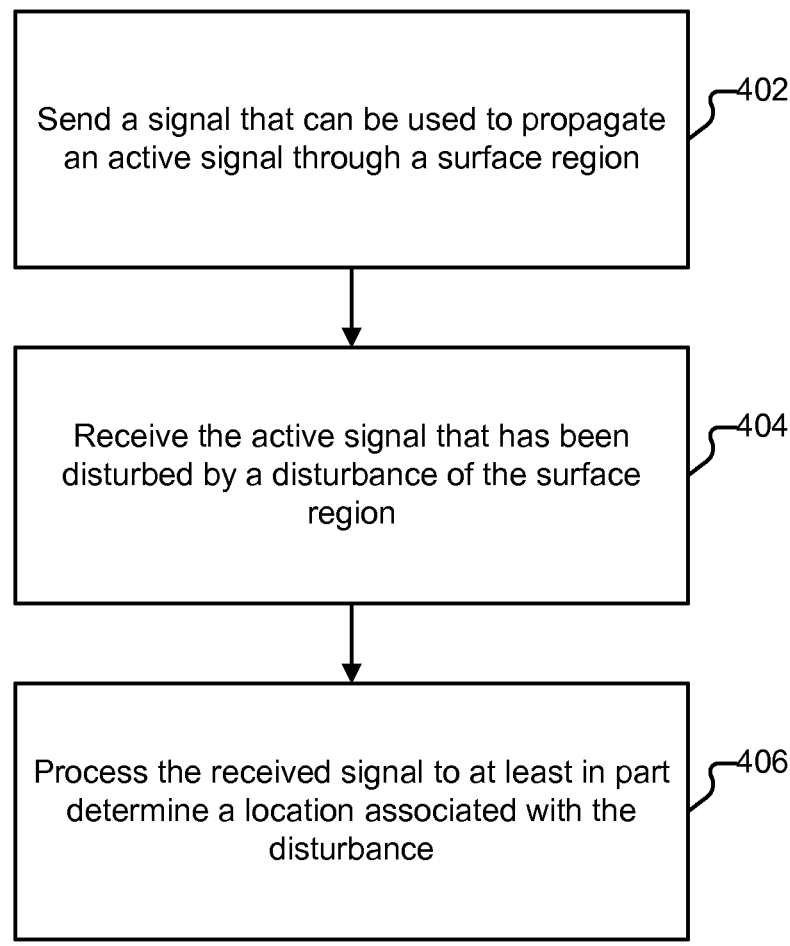
FIG. 4 is a flow chart illustrating an embodiment of a process for detecting a user touch input.

FIG. 4 is a flow chart illustrating an embodiment of a process for detecting a user touch input. In some embodiments, the process of FIG. 4 is at least in part implemented on touch detector 120 of FIG. 1 and/or touch detector 202 of FIG. 2. At 402, a signal that can be used to propagate an active signal through a surface region is sent. In some embodiments, sending the signal includes driving (e.g., using driver 214 of FIG. 2) a transmitter such as a transducer (e.g., transmitter 104 of FIG. 1) to propagate an active signal (e.g., acoustic or ultrasonic) through a propagating medium with the surface region. In some embodiments, the signal includes a sequence selected to optimize autocorrelation (e.g., resulting in narrow/short peak) of the signal. For example, the signal includes a Zadoff-Chu sequence. In some embodiments, the signal includes a pseudorandom binary sequence with or without modulation. In some embodiments, the propagated signal is an acoustic signal. In some embodiments, the propagated signal is an ultrasonic signal (e.g., outside the range of human hearing). For example, the propagated signal is a signal above 20 kHz (e.g., within the range between 80 kHz to 100 kHz). In other embodiments, the propagated signal may be within the range of human hearing. In some embodiments, by using the active signal, a user input on or near the surface region can be detected by detecting disturbances in the active signal when it is received by a sensor on the propagating medium. By using an active signal rather than merely listening passively for a user touch indication on the surface, other vibrations and disturbances that are not likely associated with a user touch indication can be more easily discerned/filtered out. In some embodiments, the active signal is used in addition to receiving a passive signal from a user input to determine the user input.

At 404, the active signal that has been disturbed by a disturbance of the surface region is received. The disturbance may be associated with a user touch indication. In some embodiments, the disturbance causes the active signal that is propagating through a medium to be detracted, attenuated, and/or delayed. In some embodiments, the disturbance in a selected portion of the active signal corresponds to a location on the surface that has been indicated (e.g., touched) by a user.

At 406, the received signal is processed to at least in part determine a location associated with the disturbance. In some embodiments, determining the location includes extracting a desired signal from the received signal at least in part by removing or reducing undesired components of the received signal such as disturbances caused by extraneous noise and vibrations not useful in detecting a touch input. In some embodiments, determining the location includes comparing the received signal to a reference signal that has not been affected by the disturbance. The result of the comparison may be used with a result of other comparisons performed using the reference signal and other signal(s) received at a plurality of sensors. The location, in some embodiments, is a location (e.g., a location coordinate) on the surface region where a user has provided a touch input. In addition to determining the location, one or more of the following information associated with the disturbance may be determined at 406: a gesture, simultaneous user indications (e.g., multi-touch input), a time, a status, a direction, a velocity, a force magnitude, a proximity magnitude, a pressure, a size, and other measurable or derived information. In some embodiments, the location is not determined at 406 if a location cannot be determined using the received signal and/or the disturbance is determined to be not associated with a user input. Information determined at 406 may be provided and/or outputted.

Although FIG. 4 shows receiving and processing an active signal that has been disturbed, in some embodiments, a received signal has not been disturbed by a touch input and the received signal is processed to determine that a touch input has not been detected. An indication that a touch input has not been detected may be provided/outputted.

Figure 5:
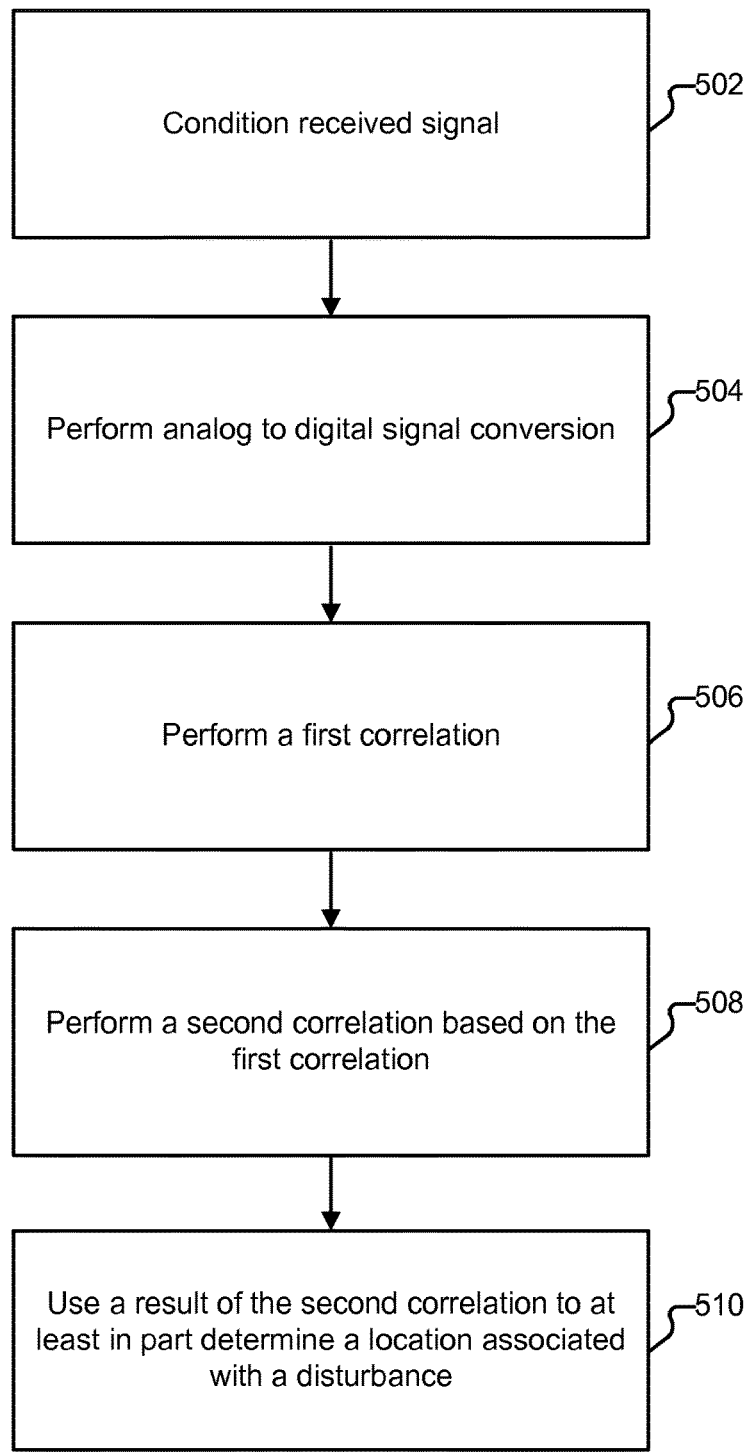
FIG. 5 is a flow chart illustrating an embodiment of a process for determining a location associated with a disturbance on a surface.

FIG. 5 is a flow chart illustrating an embodiment of a process for determining a location associated with a disturbance on a surface. In some embodiments, the process of FIG. 5 is included in 406 of FIG. 4. The process of FIG. 5 may be implemented in touch detector 120 of FIG. 1 and/or touch detector 202 of FIG. 2. At 502, a received signal is conditioned. In some embodiments, the received signal is a signal including a pseudorandom binary sequence that has been freely propagated through a medium with a surface that can be used to receive a user input. For example, the received signal is the signal that has been received at 404 of FIG. 4. In some embodiments, conditioning the signal includes filtering or otherwise modifying the received signal to improve signal quality (e.g., signal-to-noise ratio) for detection of a pseudorandom binary sequence included in the received signal and/or user touch input. In some embodiments, conditioning the received signal includes filtering out from the signal extraneous noise and/or vibrations not likely associated with a user touch indication.

At 504, an analog to digital signal conversion is performed on the signal that has been conditioned at 502. In various embodiments, any number of standard analog to digital signal converters may be used. The resulting digital signal is used to perform a first correlation at 506. In some embodiments, performing the first correlation includes correlating the converted signal with a reference signal. Performing the correlation includes cross-correlating or determining a convolution (e.g., interferometry) of the converted signal with a reference signal to measure the similarity of the two signals as a time-lag is applied to one of the signals. By performing the correlation, the location of a portion of the converted signal that most corresponds to the reference signal can be located. For example, a result of the correlation can be plotted as a graph of time within the received and converted signal (e.g., time-lag between the signals) vs. a measure of similarity. The associated time value of the largest value of the measure of similarity corresponds to the location where the two signals most correspond. By comparing this measured time value against a reference time value (e.g., at 306 of FIG. 3) not associated with a touch indication disturbance, a time delay/offset or phase difference caused on the received signal due to a disturbance caused by a touch input can be determined. In some embodiments, by measuring the amplitude/intensity difference of the received signal at the determined time vs. a reference signal, a pressure of a touch indication may be determined. In some embodiments, the reference signal is determined based at least in part on the signal that was propagated through a medium (e.g., based on a source pseudorandom binary sequence signal that was propagated). In some embodiments, the reference signal is at least in part determined using information determined during calibration at 306 of FIG. 3. The reference signal may be chosen so that calculations required to be performed during the correlation may be simplified. For example, the reference signal used in 506 is a simplified reference signal that can be used to efficiently correlate the reference signal over a relatively large time difference (e.g., lag-time) between the received and converted signal and the reference signal.

At 508, a second correlation is performed based on a result of the first correlation. Performing the second correlation includes correlating (e.g., cross-correlation or convolution similar to step 506) the converted signal in 504 with a second reference signal. The second reference signal is a more complex/detailed (e.g., more computationally intensive) reference signal as compared to the first reference signal used in 506. In some embodiments, the second correlation is performed in 508 because using the second reference signal in 506 may be too computationally intensive for the time interval required to be correlated in 506. Performing the second correlation based on the result of the first correlation includes using one or more time values determined as a result of the first correlation. For example, using a result of the first correlation, a range of likely time values (e.g., time-lag) that most correlate between the received signal and the first reference signal is determined and the second correlation is performed using the second reference signal only across the determined range of time values to fine tune and determine the time value that most corresponds to where the second reference signal (and, by association, also the first reference signal) matched the received signal. In various embodiments, the first and second correlations have been used to determine a portion within the received signal that correspond to a disturbance caused by a touch input at a location on a surface of a propagating medium. In other embodiments, the second correlation is optional. For example, only a single correlation step is performed.

At 510, a result of the second correlation is used to at least in part determine a location associated with a disturbance. In some embodiments, determining the location includes comparing a determined time value where the signals of the second correlation are most correlated and comparing the determined time value with a reference time value (e.g., determined at 306 of FIG. 3) not associated with a touch input disturbance, to determine a time delay/offset or phase difference caused on the received signal due to the disturbance (e.g., caused by a touch input). This time delay is associated with a signal received at a first sensor and other time delays due to the disturbance at other signals received at other sensors are used to calculate a location of the disturbance relative to the locations of the sensors. By using the location of the sensors relative to a surface of a medium that has propagated the received signal, a location on the surface where the disturbance originated may be determined.

Figure 6:
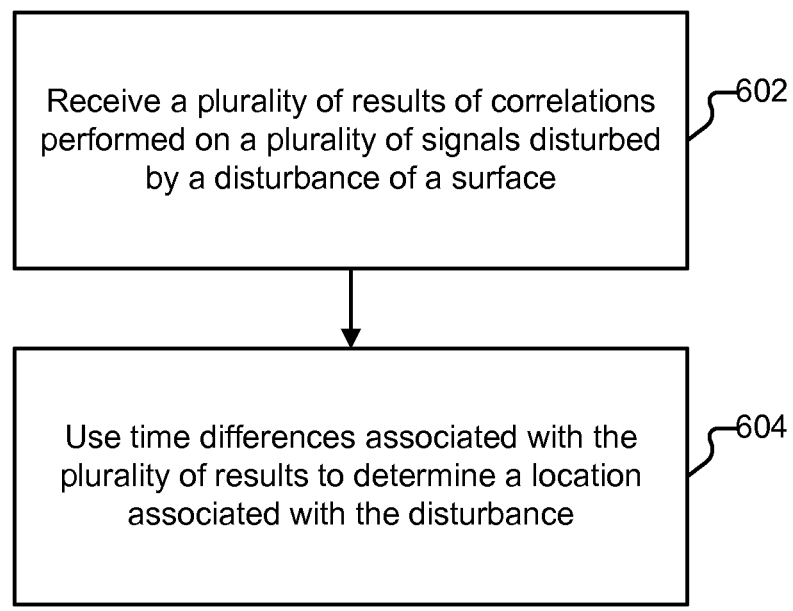
FIG. 6 is a flow chart illustrating an embodiment of a process for determining a location associated with a disturbance.

FIG. 6 is a flowchart illustrating an embodiment of a process for determining a location associated with a disturbance. In some embodiments, the process of FIG. 6 is included in 510 of FIG. 5. At 602, a plurality of results of correlations performed on a plurality of signals disturbed by a disturbance of a surface is received. For example, a result of the correlation performed at 508 of FIG. 5 is received. In some embodiments, a signal is propagated using transmitter 104 and sensors 114, 116, and 118 each receives the propagated signal that has been disturbed by a touch input on or near a surface of medium 102 of FIG. 1. The propagated signal may contain a predetermined signal and the predetermined signal is received at the various sensors. Each of the received signals is correlated with a reference signal to determine the results received at 602. In some embodiments, the received results are associated with a same signal content (e.g., same binary sequence) that has been freely propagated on a medium at the same time. In some embodiments, the received results are associated with different signal contents that have been disturbed by the same disturbance.

At 604, time differences associated with the plurality of results are used to determine a location associated with the disturbance. In some embodiments, each of the time differences is associated with a time when signals used in the correlation are most correlated. In some embodiments, the time differences are associated with a determined time delay/offset or phase difference caused on the received signal due to the disturbance. This time delay may be calculated by comparing a time value determined using a correlation with a reference time value that is associated with a scenario where a touch input has not been specified. The result of the comparison may be used to calculate a location of the disturbance relative to the locations of sensors that received the plurality of signals. By using the location of the sensors relative to a surface of a medium that has propagated the received signal, a location on the surface where the disturbance originated may be determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A touch input system, comprising:
a medium configured to receive a touch input on a touch input region of the medium, wherein the medium includes a first surface where the touch input is receivable;
an antenna coupled to the medium as a layer that is at least in part transparent, wherein the antenna is a wireless communication antenna configured to receive a wireless signal, the antenna is not a touch detection conductor, and the antenna is not utilized to detect a capacitance change or a resistance change to detect the touch input;
an acoustic transmitter substantially coupled to the medium, wherein the transmitter is configured to freely propagate a signal through the medium in multiple directions within the touch input region from the same acoustic transmitter to a plurality of detectors and the freely propagated signal includes at least one of an acoustic signal or an ultrasonic signal;
at least one of the detectors configured to receive a disturbed signal, wherein the disturbed signal includes at least a portion of the freely propagated signal that has been disturbed by the touch input on the first surface;
a digital signal generator configured to generate a simplified reference signal based at least in part a pseudorandom binary sequence included in the freely propagated signal of the acoustic transmitter; and
a processor configured to determine a force of the touch input based at least in part on a comparison of the disturbed signal to the simplified reference signal.

2. The system of claim 1, wherein the antenna is coupled to the medium on a second surface substantially opposite the first surface of the medium.

3. The system of claim 1, further comprising a second antenna located substantially adjacent and parallel to the medium.

4. The system of claim 1, wherein at least a portion of the medium is included in a display screen.

5. The system of claim 1, wherein at least a portion of the antenna is positioned over a display screen.

6. The system of claim 1, wherein the antenna includes a first conductive element that has a physical separation from one or more other conductive elements of the antenna.

7. The system of claim 1, wherein a ground plane of a circuit board coupled to the antenna functions as a conductive element of the antenna.

8. The system of claim 1, wherein a display screen coupled to the antenna functions as a conductive element of the antenna.

9. The system of claim 1, wherein the antenna is a planar inverted-F antenna.

10. The system of claim 1, wherein the antenna is at least a part of a multiple-input and multiple-output antenna configuration.

11. The system of claim 1, wherein the antenna is at least a part of a phased array antenna configuration.

12. The system of claim 1, wherein the antenna includes an indium tin oxide material.

13. The system of claim 1, wherein the antenna includes a carbon nanotube.

14. The system of claim 1, wherein the antenna includes a nanowire.

15. The system of claim 1, wherein the antenna includes a nanomesh.

16. The system of claim 1, wherein the antenna includes a silver-doped ink.

17. The system of claim 1, wherein the disturbance corresponds to a user indication and the user indication includes a location on the first surface of the medium where a user input was received.

18. The system of claim 1, wherein the transmitter includes an ultrasonic transducer.

19. The system of claim 1, wherein the transmitter includes a transducer.

20. A touch detection apparatus, comprising:
medium means for receiving a touch input on a touch input region of the medium, wherein the medium means includes a first surface where the touch input is receivable;
antenna means for receiving a wireless signal without detecting the touch input, wherein the antenna means is coupled to the medium means as a layer that is at least in part transparent;
acoustic transmitter means for freely propagating a signal through the medium means in multiple directions within the touch input region from the same acoustic transmitter means to a plurality of detectors, wherein the transmitter means is substantially coupled to the medium means and the freely propagated signal includes at least one of an acoustic signal and an ultrasonic signal;
a detector means for detecting a disturbed signal, wherein the detector means is included in the plurality of detectors and the disturbed signal includes at least a portion of the freely propagated signal that has been disturbed by the touch input on the first surface;
a digital signal generator means for generating a simplified reference signal based at least in part a pseudorandom binary sequence included in the freely propagated signal of the acoustic transmitter; and
a processor means for determining a force of the touch input based at least in part on a comparison of the disturbed signal to the simplified reference signal.

21. The system of claim 1, wherein the disturbance includes a time delay difference of the freely propagated signal caused by the touch input.

* * * * *

UNITED STATES PATENT AND TRADEMARK OFFICE
CERTIFICATE OF CORRECTION

PATENT NO. : 10,235,004 B1
APPLICATION NO. : 13/681279
DATED : March 19, 2019
INVENTOR(S) : Lapoe E. Lynn et al.

Page 1 of 1

It is certified that error appears in the above-identified patent and that said Letters Patent is hereby corrected as shown below:

On the Title Page

Page 3, Column 1, Line 44, US2010/0117993 A1, delete "G06F 3/0418" and insert --G06F 3/0436--, therefor.

Page 3, delete "Liu et al., "Acoustic Wave Approach for Multi-Touch Tactile Sensing", Micro-NanoMechatronics and Human Science, MHS 2009. International Symposium, Nov. 9-11, 2009." and insert --Liu et al., "Acoustic Wave Approach for Multi-Touch Tactile Sensing", Micro-NanoMechatronics and Human Science, *2009.* MHS 2009. International Symposium, Nov. 9-11, 2009.--, therefor.

Signed and Sealed this
Thirty-first Day of December, 2019

Andrei Iancu
*Director of the United States Patent and Trademark Office*